(12) United States Patent
Reusche et al.

(10) Patent No.: US 7,917,019 B2
(45) Date of Patent: Mar. 29, 2011

(54) SYSTEMS AND METHODS FOR TEMPERATURE SENSING IN A DEICER

(75) Inventors: Thomas K. Reusche, Elburn, IL (US); Philip E. Chumbley, Aurora, IL (US); James R. McHugh, Downers Grove, IL (US)

(73) Assignee: Allied Precision Industries, Inc., Elburn, IL (US)

(*) Notice: Subject to any disclaimer, the term of this patent is extended or adjusted under 35 U.S.C. 154(b) by 1370 days.

(21) Appl. No.: 11/414,651

(22) Filed: Apr. 28, 2006

(65) Prior Publication Data
US 2006/0249505 A1 Nov. 9, 2006

Related U.S. Application Data

(60) Provisional application No. 60/677,253, filed on May 3, 2005, provisional application No. 60/685,987, filed on May 31, 2005, provisional application No. 60/677,548, filed on May 4, 2005, provisional application No. 60/676,793, filed on May 2, 2005, provisional application No. 60/741,832, filed on Dec. 2, 2005.

(51) Int. Cl.
*H05B 3/80* (2006.01)

(52) U.S. Cl. .......................... 392/499; 392/497; 392/498

(58) Field of Classification Search ........... 392/497–499
See application file for complete search history.

(56) References Cited

U.S. PATENT DOCUMENTS

| | | | |
|---|---|---|---|
| 2,430,272 A * | 11/1947 | Brodie | 119/73 |
| 2,472,178 A * | 6/1949 | Temple | 392/499 |
| 2,514,559 A * | 7/1950 | Riemenschneider | 392/499 |
| 2,520,576 A * | 8/1950 | Stookey | 392/499 |
| 2,561,932 A * | 7/1951 | Landgraf | 119/73 |
| 2,877,051 A | 3/1959 | Cushman et al. | |
| 3,096,425 A * | 7/1963 | Keating et al. | 392/499 |
| 3,836,130 A | 9/1974 | Earhart et al. | |
| 4,166,086 A | 8/1979 | Wright | |
| 4,599,973 A | 7/1986 | Ward | |
| 4,835,366 A * | 5/1989 | Owen et al. | 392/499 |
| 5,245,691 A * | 9/1993 | Wu | 392/365 |
| 5,303,585 A | 4/1994 | Lichte | |
| 5,336,399 A | 8/1994 | Kajisono | |
| 5,933,575 A * | 8/1999 | Sanders | 392/501 |
| 5,980,100 A | 11/1999 | Haegeman | |
| 6,125,696 A | 10/2000 | Hannan et al. | |
| 6,597,863 B2 | 7/2003 | Koskey, Jr. | |
| 6,778,763 B1 * | 8/2004 | Reusche et al. | 392/499 |
| 2005/0121645 A1 | 6/2005 | Prescott | |

FOREIGN PATENT DOCUMENTS

| | | |
|---|---|---|
| DE | 196 45 970 | 5/1998 |
| WO | WO 98/57132 | 12/1998 |
| WO | WO 2006/026624 | 9/2006 |

\* cited by examiner

*Primary Examiner* — Thor S Campbell
(74) *Attorney, Agent, or Firm* — McAndrews, Held & Malloy, Ltd.

(57) ABSTRACT

Certain embodiments of the present invention provide a deicer system for heating water within a fluid receptacle to prevent ice from forming including a main body configured to be positioned within the fluid receptacle, a heating element adapted to heat the water, a temperature sensor adapted to detect a temperature, and a control unit in communication with the heating element and the temperature sensor. The heating element is supported by the main body. The temperature sensor is thermally connected to the heating element. The control unit is adapted to determine a temperature of the water based at least in part on the temperature detected by the temperature sensor. The control unit is adapted to control the heating element based at least in part on the determined temperature of the water.

18 Claims, 12 Drawing Sheets

SYSTEMS AND METHODS FOR TEMPERATURE SENSING IN A DEICER

RELATED APPLICATIONS

The present application relates to and claims the benefit of U.S. Provisional App. No. 60/677,253, entitled "System and Method for Controlling a Deicer," filed May 3, 2005; U.S. Provisional App. No. 60/685,987, entitled "System and Method for Controlling a Deicer," filed May 31, 2005; U.S. Provisional App. No. 60/677,548, entitled "System and Method for Preventing Over-Temperature Condition in a Deicer," filed May 4, 2005; U.S. Provisional App. No. 60/676,793, entitled "Deicer Thermostat with Adjustable Response Time," filed May 2, 2005; and U.S. Provisional App. No. 60/741,832, entitled "Operational Control of Deicers Using Multiple Temperature Detectors," filed Dec. 2, 2005. The foregoing applications are herein incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present invention generally relate to a system and method of deicing water within a receptacle, such as a pond, birdbath, or the like. More particularly, embodiments of the present invention relate to systems and methods for temperature sensing in a deicer.

Heating or deicing systems have commonly been used to maintain unfrozen areas in fluids such as water. For example, deicing systems may be used in water tanks for livestock, fish ponds, and the like. Early deicers burned wood, coal, or gas while most deicers today are electric. A typical deicing system includes a heater coil. The heat from the coil is transferred to the fluid to keep the fluid from freezing. Electric deicers typically range from 1000 to 1500 watts and may include thermostats that are commonly used to turn the unit on or off in order to introduce heat into the fluid when freezing conditions exist.

Many property owners have ponds located within their property. During winter months in colder climates, the ponds tend to freeze over with ice. When the ponds freeze over, toxic gases are trapped under the ice and pose a hazard to fish living within the pond. If the frozen surface is not broken in order to allow toxic gases to escape, the water below the frozen surface may become overly concentrated with nitrates, for example. Thus, the ice typically is broken in order to allow the toxic gases to escape.

In order to gain access to water below the surface for various activities and provide a path for toxic gases to escape, the frozen surface of the water is typically broken, drilled, or the like, in order to provide an accessible path to the water below. However, conventional methods of providing access to the water are typically labor-intensive, time-consuming, and typically do not prevent subsequent freezing.

As an alternative to conventional methods, pond heaters may maintain an ice-free area within a body of water. However, typical pond heaters are expensive to operate because they operate between approximately 1000 and 1500 watts or more, and, as such, may be dangerous.

Deicers typically are one of three types: (1) floating deicers, wherein the heating element is suspended from a floatation device such that it operates near the surface of the fluid; (2) sinking deicers, wherein the deicer rests upon the bottom of the pond or tank, usually attached to a guard such that the heating element is not in direct contact with the bottom; or (3) drain plug deicers mounted through the drain hole in a livestock tank.

Each of these three types has its own advantages and disadvantages. A floating deicer can more accurately measure the temperature at the surface where freezing will occur, thus it can be set more accurately to turn on at the optimum temperature. However, a deicer on the surface is also within reach of animals that may interfere with its operations or attempt to flip it out of the tank.

Sinking deicers, on the other hand, are often out of sight. However, because the deicer is positioned near the bottom of the fluid and freezing occurs at the top, a temperature gradient between the top and bottom of the fluid may exist. As such, the deicer may turn on at a higher temperature and heat more of the fluid, thereby having a reduced efficiency when compared to a floating deicer.

Drain plug deicers conveniently mount through the drain hole of a livestock tank where they are out of reach of animals and the cord can be protected. However, they also share the disadvantages of a sinking deicer, and have the additional disadvantage of requiring the tank to be drained in order to install the unit.

Deicers typically contain a thermostat to activate the heating element whenever the fluid temperature falls to a point where freezing may occur. The following discussion assumes the fluid is water, with a freezing point of 32 degrees Fahrenheit (F.). In deicers with thermostats, the thermostat will normally turn on at around 40 degrees F. and will turn off after the water temperature has risen a number of degrees. While the water will not freeze until it reaches 32 degrees F., the set point for turning on the thermostat is usually situated around 40 degrees F. to accommodate the uncertainty in accurately determining the set point during production. That is, the set points of a batch of thermostats designed to turn on at 40 degrees F. may actually have a spread of +/−7 degrees F. around that temperature.

Thermostatically-controlled deicers include a thermostat that is placed in series with the heating element. The deicers are normally preset to turn on when the fluid temperature reaches a value approaching the freezing point and turn off when the fluid temperature reaches a value tens of degrees above the freezing point. The thermostat may include bimetal arms that serve as the electrical switch for the deicer. Thus, no additional components are required.

The thermostats used in deicers are typically of the bimetal type. Typical turn-on/turn-off set points are around 45 degrees F. and 70 degrees F., respectively. However, the actual on/off temperatures of the thermostats are usually specified with a range of 5-8 degrees F. above and below these set points because, as mentioned above, the thermostat may have an actual spread of +/−7 degrees F. due to inaccuracy during production. While this range is necessary in order to keep the price of the thermostats down, it is not desirable from an operation standpoint since the deicer could turn on when the water temperature is only 50 degrees F. with no danger of freezing. For a 1500 watt deicer, the operation can therefore be needlessly expensive. Thus, it is highly desirable to have a deicer that is capable making more accurate temperature determinations and of making more intelligent decisions regarding temperature conditions.

The thermostat may also serve as a safety device when a thermal path is provided from the heating element to the thermostat such that it will shut off if excess heat is detected. Excess heating may occur if the heater is removed from the fluid, for example. A typical deicer contains a heating element rated at 1000-1500 watts. When submerged, the heating element of the deicer would normally run at a surface temperature of less than 150 degrees F. since the water rapidly transfers heat away from the heating element. Deicers with mechanical thermostats typically contain a thermal path from the heating element to the thermostat such that, in the absence of water, heat is transferred to the thermostat so that its temperature rises quickly and the thermostat is triggered to de-energize the heating element. The amount of time required to de-energize the heating element may be as much as a minute or more, during which time, the temperature of the heating element may rise to several hundred degrees. While the temperature may be too low to ignite paper, it can be high enough to cause burns to livestock or humans that come in contact with the heating element.

Another potentially harmful over-temperature condition may occur if the heating element is tilted such that only a portion of the heating element extends beyond the water while the thermostat is still submerged. In this case, the exposed portion of the heating element may overheat, but the thermostat will not register the over-heat condition because the thermal path from the exposed portion of the heating element to the thermostat is partially submerged and the water may dissipate the heat along that path. The heating element may glow red-hot and become hot enough to ignite paper or wood or melt the side of a plastic water tank. In addition, the exposed section of the heating element may cause severe burns to livestock or humans. Thus, a means for detecting over-temperature conditions, where all or a portion of the heating element is exposed, is desirable.

For any given thermostat, the response of the thermostat is dependent upon the set-point temperature, the rate of heat buildup in the thermostat, and the rate of heat loss from the thermostat.

Many thermostats have an adjustable set-point. A common example of this is a furnace thermostat in a home. The temperature at which the thermostat trips, or changes state, can be changed mechanically or electronically. Other thermostats, however, are non-adjustable and are preset to trip within a certain temperature range. These thermostats are typically set by mechanically adjusting the arms of a bimetal switch or the force upon those arms.

Regardless of the set-point of a thermostat, the thermostat's response is directly influenced by the rate at which heat is carried to and from the thermostat. For example, a hotplate may contain a thermostat to shut off power to the unit to prevent overheating, but if the hotplate is operated inside a freezer, the thermostat may never shut off because the heat may be carried away faster than it is produced.

Because thermal characteristics can vary greatly between different operating environments, and the desired response of deicers can vary between users, it is desirable to provide some means of controlling the response of a thermostat that would otherwise be non-adjustable.

Thus, it is highly desirable to have a deicer that is capable making more accurate temperature determinations and of making more intelligent decisions regarding temperature conditions. Further, a means for detecting over-temperature conditions, where all or a portion of the heating element is exposed, is desirable. In addition, it is desirable to provide some means of controlling the response of a thermostat that would otherwise be non-adjustable. Therefore, there exists a need for systems and methods for temperature sensing in a deicer.

BRIEF SUMMARY OF THE INVENTION

Certain embodiments of the present invention provide a deicer system for heating water within a fluid receptacle to prevent ice from forming including a main body configured to be positioned within the fluid receptacle, a heating element adapted to heat the water, a temperature sensor adapted to detect a temperature, and a control unit in communication with the heating element and the temperature sensor. The heating element is supported by the main body. The temperature sensor is thermally connected to the heating element. The control unit is adapted to determine a temperature of the water based at least in part on the temperature detected by the temperature sensor. The control unit is adapted to control the heating element based at least in part on the determined temperature of the water.

Certain embodiments of the present invention provide a deicer for heating water within a fluid receptacle to prevent ice from forming including a main body configured to be positioned within the fluid receptacle, a heater adapted to heat the water, a thermostat adapted to detect a temperature, and a movable tab. The heater is supported by the main body. The thermostat is separated from the heater by a thermally isolating material. The tab is adapted to provide a heat flow path from the heater to the thermostat. The tab is adapted to be movably positioned to alter the rate of heat from between the thermostat and the heater.

Certain embodiments of the present invention provide a method for controlling a heating element in a deicer system configured to be positioned within a fluid receptacle to prevent ice from forming within the fluid receptacle including detecting a temperature with a temperature sensor, communicating the detected temperature to a control unit, determining with the control unit a temperature of the water based at least in part on the detected temperature, and controlling with the control unit a heating element based on the determined temperature of the water.

Figure 1:
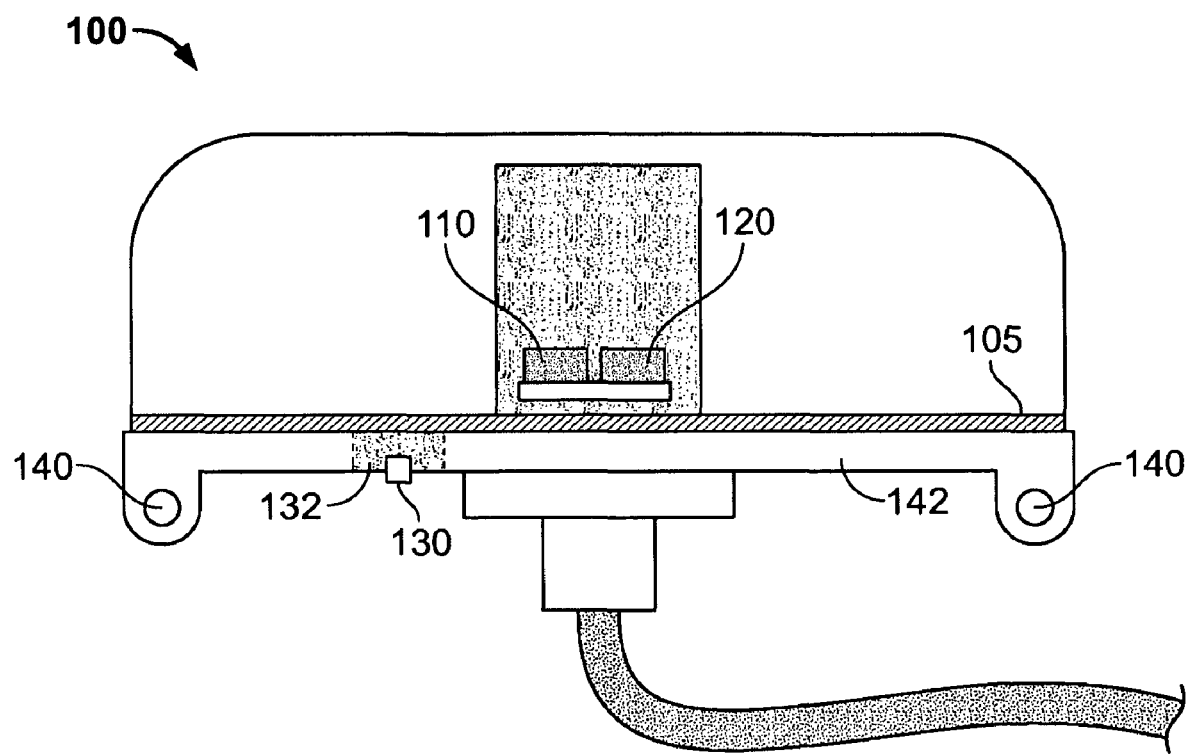
FIG. 1 illustrates a front perspective view of a deicing system according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIG. 1 illustrates a front perspective view of a deicing system 100 according to an embodiment of the present invention. The deicing system 100 includes a main body 105 configured to be positioned within a fluid receptacle. The main body 105 may include an annular frame or support, such as a ring, for example. The main body 105 supports a control unit 110, a switch 120, a temperature sensor 130, and a heating element 140. In addition, as illustrated in FIG. 1, the deicing system 100 may include a thermal isolating material 132 and a plate 142. In certain embodiments, one or more of the elements illustrated in FIG. 1 may not be included.

In operation, the control unit 110 activates and/or deactivates the heating element 140 based at least in part on a temperature sensed by the temperature sensor 130. That is, the control unit 110 uses the switch 120 to control the flow of power to the heating element 140. When power flows to the heating element 140, the heating element 140 is activated to generate heat. When power is prevented from flowing to the heating element 140, the heating element 140 is deactivated, thereby not generating heat.

The control unit 110 is adapted to control the heating element 140. In certain embodiments, the control unit 110 controls the heating element 140 using the switch 120. As discussed above, the control unit 110 may use the switch 120 to activate and/or deactivate the heating element 140. In certain embodiments, the control unit 110 is adapted to control the heating element 140 based at least in part on a predetermined temperature, such as a stored temperature value within the control unit 110. The temperature may be a temperature determined and/or detected by temperature sensor 130, for example. In certain embodiments, the control unit 110 is adapted to control the heating element 140 based at least in part on a time interval. For example, the control unit 110 may activate the heating element 140 for a calculated period of time.

In certain embodiments, the control unit 110 includes a processor or microprocessor. The control unit 110 may include an integrated circuit and/or be implemented using one or more discrete logic components. For example, the control unit 110 may be implemented using one or more chips including gates such as AND, OR, NAND, and NOR gates. The control unit 110 may include more than one processor, microprocessor, and/or integrated circuit. For example, different functions and/or capabilities of the control unit 110 may be handled by different processors, microprocessors, and/or integrated circuits.

In certain embodiments, the control unit 110 is adapted to read and/or determine a temperature through the temperature sensor 130. The temperature may be a fluid temperature, air temperature, a temperature of all or a section of the heating element 140 and/or the plate 142, for example. Further, the control unit 110 may be capable of tracking elapsed time. For example, the control unit 110 may be capable of determine how long the heating element 140 has been activated. As another example, control unit 110 may be capable of determining and/or measuring the number of milliseconds and/or microseconds between temperature readings/determinations. In certain embodiments, the control unit 110 may read and/or determine the temperature using more than one temperature sensor. The control unit 110 may average temperature readings from multiple temperature sensors. Alternatively, the control unit 110 may read and/or determine more than one temperature using more than one sensor. For example, the control unit 110 may read an air temperature from one sensor and a fluid temperature from another sensor.

The control unit 110 may be adapted to detect a dangerous condition such as an over-temperature condition. For example, one or more temperature sensors 130 may be monitored by the control unit 110 to deactivate the heating element 140 when the heating element 140 reaches a critical temperature. If some portion or section of the heating element 140 and/or the plate 142 becomes located outside of a fluid, the heating element 140 and/or the plate 142 may overheat. The overheated condition may be detected by the control unit 110, which may in turn deactivate the heating element 140 to prevent damage to the deicing system 100 and/or to other animals, persons, and/or objects near the deicing system 100.

The temperature sensor 130 is adapted to determine and/or detect a temperature. The temperature sensor 130 may be adapted to determine the temperature of a fluid, an air temperature, a temperature of heating element 140, and/or a temperature of plate 142, for example. In certain embodiments, one or more temperature sensors may be included in the deicing system 100. For example, the deicing system 100 may include a temperature sensor 130 for determining fluid temperature and a temperature sensor 130 for determining air temperature. Moreover, the temperature sensor 130 may be adapted to communicate the detected and/or determined temperature to the control unit 110. The resolution or sensitivity of the temperature sensor 130 may be selected to be on the order of 1 degree F., for example. Alternatively, the resolution or sensitivity of the temperature sensor 130 may be selected to be on the order of 0.2 degrees F.

Although the above discussion refers to the determination of a temperature, it is to be understood that the temperature sensor may actually determine and/or measure only a current or voltage, for example, that is correlated and/or calibrated to represent a particular temperature. The temperature sensor 130 may include one or more of a thermistor, thermometer, thermocouple, resistance temperature detector, silicon bandgap temperature sensor, and/or other component adapted to create a signal that may be measured electronically and/or electrically as a function of temperature.

The temperature sensor 130 may be thermally isolated from one or more elements of the deicing system 100. For example, the temperature sensor 130 may be thermally isolated from the heating element 140 by the thermally isolating material 132. Thus, the temperature sensor 130 may determine the temperature of a fluid while the effect of heating element 140 is reduced due to the thermal isolation. The thermally isolating material 132 may include epoxy or other material with effective thermal insulation properties, for example.

The heating element 140 is adapted to transfer heat to a fluid. That is, the heating element 140 is adapted to heat the fluid. The heating element 140 may be a calorimeter rod, for example. The heating element 140 may be connected, embedded, encased, enclosed, in whole or in part, within the plate 142. The heating element 140 may be thermally coupled to the plate 142. The plate 142 may be aluminum, copper, or other element, alloy, or material capable of transferring heat from heating element 140 to a fluid.

The amount of heat required to raise the temperature of a body of water by a certain amount is given by equation (1):

$$\Delta Q = Mc\Delta T \qquad (1)$$

where $\Delta Q$ is the amount of heat required, M is the mass of the body of water, c is the specific heat of the water, and $\Delta T$ is the change in temperature. Differentiating equation (1) with respect to time (t) gives equation (2):

$$dQ/dt = Mc(dT/dt) \qquad (2)$$

The heat quantity dQ/dt is the rate of heat flow, H, so equation (2) can then be written as:

$$H = Mc(dT/dt) \qquad (3)$$

Thus, for a given value of H, as shown by equation (3), the rise in temperature is linear over time.

Similarly, for heat transfer through a material, the rate of heat flow is given by equation (4):

$$H = -kA(dT/dx) \qquad (4)$$

where H is the rate of heat flow, k is the thermal coefficient of the material, A is the cross-sectional area of the thermal path, and (dT/dx) is the rate of temperature change with regard to distance along the material. For a material of thickness X between two temperatures of $T_1$ and $T_2$, the heat flow is given by equation (5):

$$H = -kA(T_2 - T_1)/X = -kA(\Delta T)/X \qquad (5)$$

Figure 2:
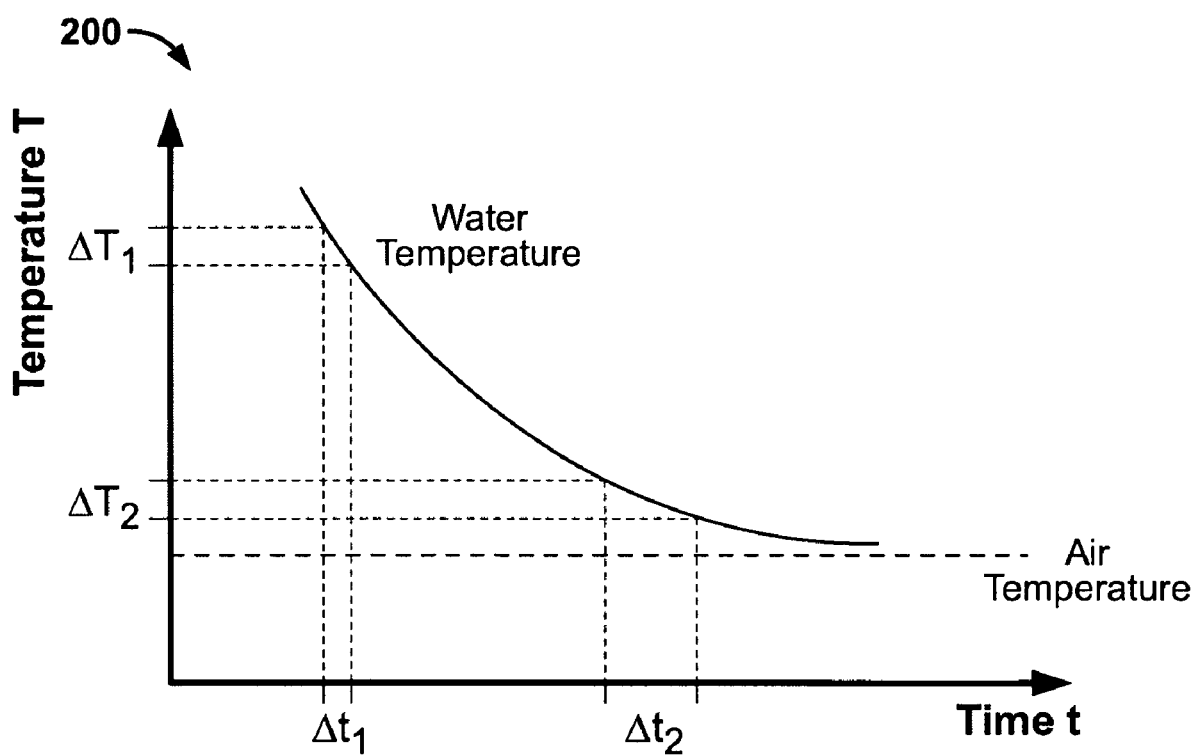
FIG. 2 illustrates a graph of the temperature of a body of water over time as heat is lost to the air.

From equation (5) it is seen that, as $T_1$ approaches $T_2$, $\Delta T$ decreases and the rate of heat flow H decreases. In other words, the flow of heat from one side of the material to the other side slows down. FIG. 2 illustrates a graph 200 of the temperature of a body of water over time as heat is lost to the air. As shown in FIG. 2, $\Delta T_1$, is the same temperature difference as $\Delta T_2$, however, $\Delta T_1$ occurs at a higher temperature above the air temperature. The corresponding change in time for $\Delta T_1$, is $\Delta t_1$. The corresponding change in time for $\Delta T_2$ is $\Delta t_2$. Even though, as mentioned, the magnitudes of $\Delta T_1$, and $\Delta T_2$ are equal, the corresponding change in time for $\Delta T_1$, (i.e., $\Delta t_1$) is shorter than for the corresponding change in time for $\Delta T_2$ (i.e., $\Delta t_2$). That is, $\Delta t_2$ is greater than $\Delta t_1$. Thus, as the temperature of the water approaches the temperature of the air, the rate at which heat is lost decreases.

Figure 3:
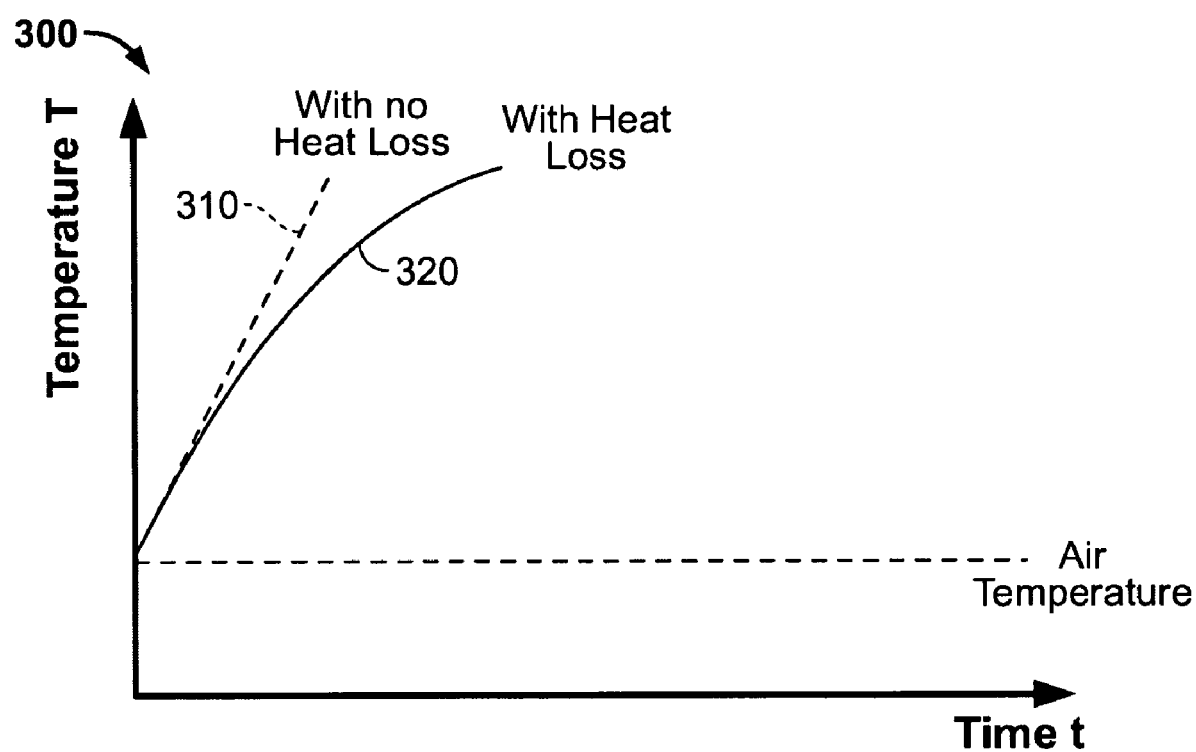
FIG. 3 illustrates a graph of the effect over time of heat loss on a body of water as heat is introduced into the water.

FIG. 3 illustrates a graph 300 of the effect over time of heat loss on a body of water as heat is introduced into the water. As discussed above, according to equation (3), as the water is heated, the temperature of the water without accounting for heat loss to the air 310 is linear. However, as discussed above, heat is lost to the air. Thus, the temperature of the water accounting for heat loss to the air 320, is not linear, because heat is lost at a faster rate as the temperature of the water rises above the temperature of the air.

Figure 4:
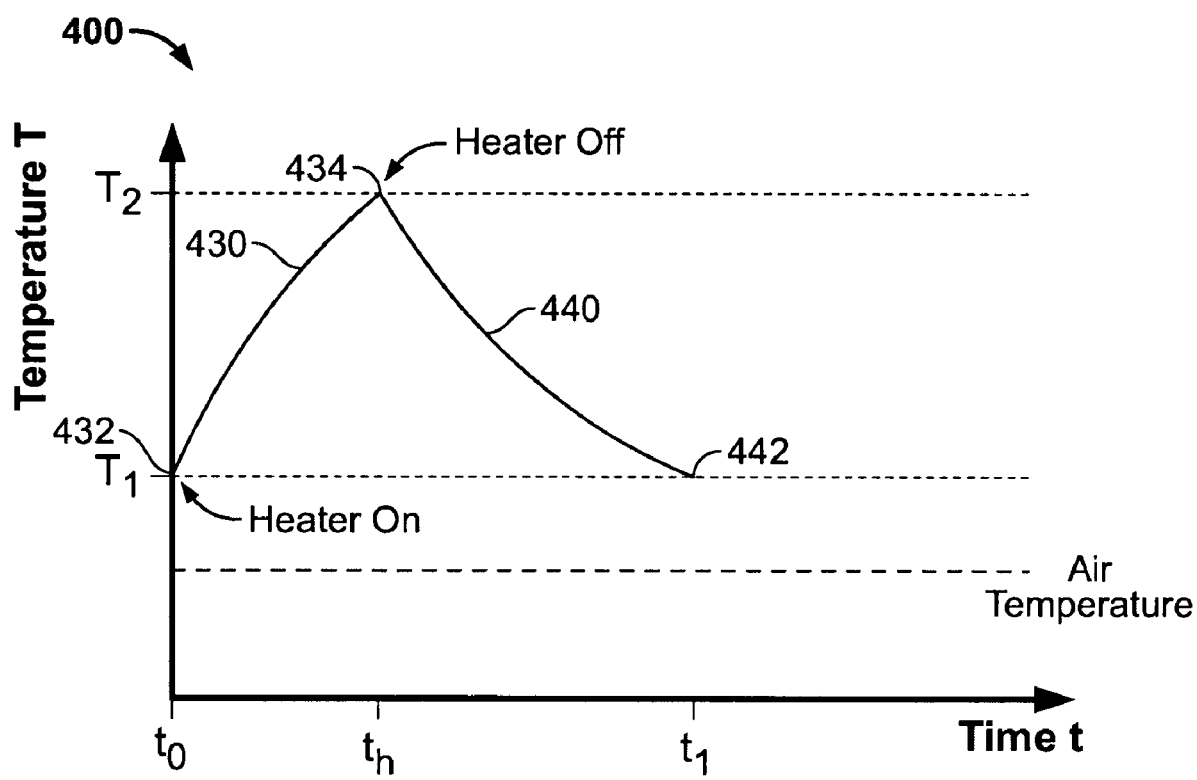
FIG. 4 illustrates a graph of the temperature of a body of water over time.

FIG. 4 illustrates a graph 400 of the temperature of a body of water over time. More particularly, FIG. 4 illustrates the temperature of the body of water as it is heated 430, starting from a temperature $T_1$ until the temperature reaches a temperature $T_2$. The water is heated beginning at time $t_0$ 432 until time $t_h$ 434. The temperature of the water then cools 440 from temperature $T_2$ to temperature $T_1$ because the air temperature is below both temperatures $T_2$ and $T_1$. The amount of time for one cycle is $t_1$ 442, when the temperature returns to the turn-on temperature that the cycle started from.

Figure 5:
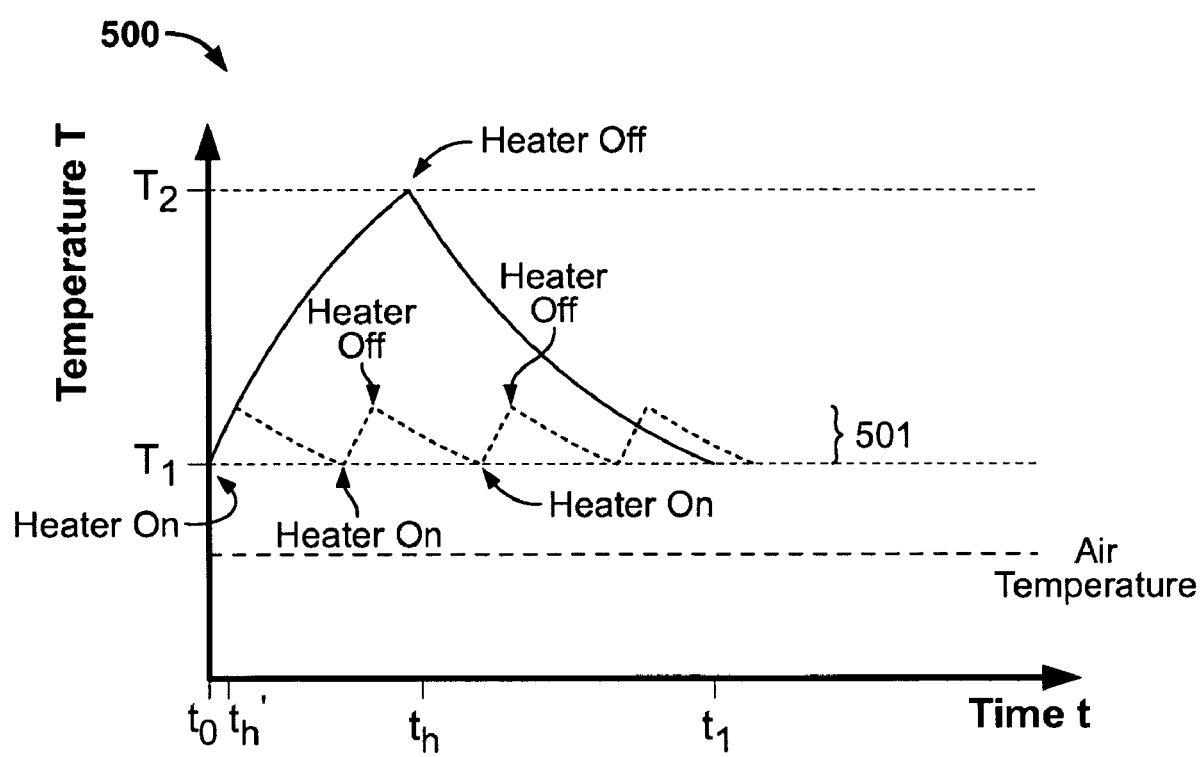
FIG. 5 illustrates a graph of the temperature of a body of water over time.

FIG. 5 illustrates a graph 500 of the temperature of a body of water over time. More particularly, FIG. 5 includes the graph 400 in FIG. 4 with four heating cycles 501 superimposed. The heating cycles 501 heat the body of water to a temperature that is only 20% of $T_2$. The four heating cycles 501 take approximately the same time for the one cycle illustrated in FIG. 4, $t_1$. However, the four heating cycles 501 take advantage of the property discussed above in reference to FIG. 2, that the heat loss for each cycle in the four heating cycles 501 is slower relative to the heat loss 440 in the cycle from FIG. 4. Further, the temperature rise when the heater for time $t_h'$ occurs in the steepest, and therefore most efficient, portion of the heating curve for the four heating cycles 501. Thus, the water temperature is being cycled through a range where it heats the quickest and cools off the slowest, and therefore the heater is on for a less time in the four heating cycles 501.

As illustrated in FIG. 5, the amount of time to go through one cycle ($t_1$) of the heating/cooling period illustrated in FIG. 4 is approximately 3.7 cycles of the heating/cooling at the lower temperature. Thus, the amount of time that the heater is turned on for one of the heating cycles in the four heating cycles 501, $t_h'$, is only 12.5% of the original time $t_h$. Multiplying this figure by 3.7 gives 46.25%. Thus, while the water temperature is still maintained at or above $T_1$, decreasing the temperature range by 20% results in an improvement in efficiency by over 50%. So, for example, if it cost $100.00 to operate a deicer for one month where the temperature is cycled between 40 degrees F. and 60 degrees F., it would cost only $46.25 to deice the same body of water simply by cycling the temperature between 40 degrees F. and 45 degrees F.

As discussed above, certain embodiments of the present invention include one or more temperature sensors 130 with a resolution or sensitivity selected to be on the order of 1 degree F. and/or 0.2 degrees F., allowing heating/cooling cycles within narrow temperature ranges, not possible using thermostats. For example, certain embodiments are adapted to control the heating element 140 over about a 2 degree temperature range. As another example, certain embodiments are adapted to control the heating element 140 over about a 4 degree temperature range. As another example, certain embodiments are adapted to control the heating element 140 over about a 10 degree temperature range. As another example, certain embodiments are adapted to control the heating element 140 over about a 20 degree temperature range. In certain embodiments, the control unit 110 can be configured to control the heating element 140 over a selected temperature range from about 1 degree to about 20 degrees.

When a temperature is detected in a deicer, such as the temperature detected by temperature sensor 130 in deicing system 100, the result may be interfered with when the heating element 140 is activated. That is, a temperature detected when the heating element 140 is activated reflects a combination of the water and heater element 140 and/or plate 142 temperatures. In current systems employing a thermostat, it is not possible to accurately detect the temperature of the water when the heating element is activated.

Figure 6:
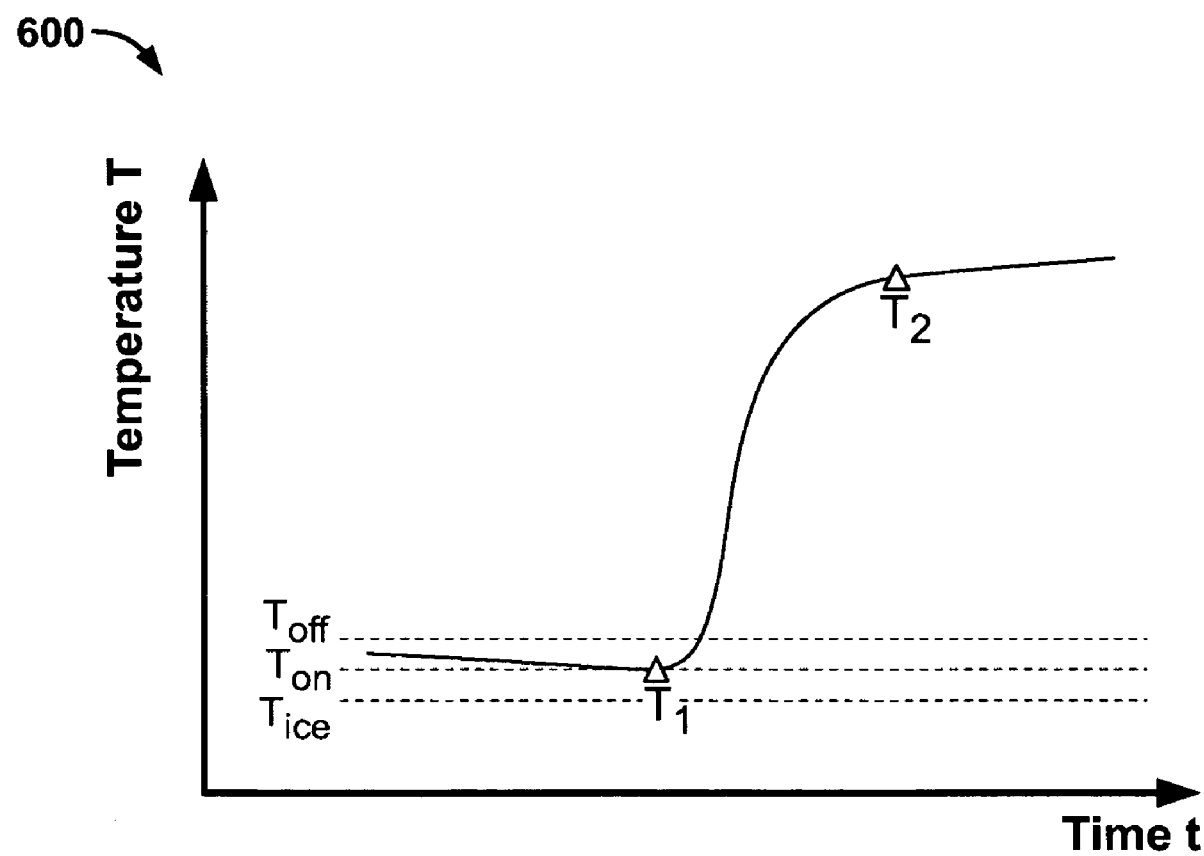
FIG. 6 illustrates a graph of the temperature detected by the temperature sensor over time.

In certain embodiments, the control unit 110 is capable of determining a water temperature when the heating element 140 is activated. FIG. 6 illustrates a graph 600 of the temperature detected by the temperature sensor 130 over time. The graph 600 includes a freezing point $T_{ice}$, a turn-on temperature $T_{on}$, and a turn-off temperature $T_{off}$. The freezing point $T_{ice}$ may be about 32 degrees F., for example. The turn-on temperature $T_{on}$ may be about 40 degrees F., for example. The turn-off temperature $T_{off}$ may be about 44 degress F., for example. Alternatively, the turn-on temperature $T_{on}$ may be about 35 degrees F. and the turn-off temperature $T_{off}$ may be about 39 degrees F.

In operation, when the temperature sensor 130 detects that the temperature has reached the turn-on temperature $T_{on}$, the control unit 110 may take and store a first temperature reading $T_1$ and then activates heating element 140. Because the temperature sensor 130 may be in contact with and/or embedded in the plate 142, the temperature detected by the temperature sensor 130 reflects the temperature of the plate 142. The first temperature reading $T_1$ should be about the turn-on temperature $T_{on}$, as the temperature of the plate 142 typically is in equilibrium with the water temperature. The temperature of the plate 142 generally reaches equilibrium, or about equilibrium, with the water temperature in anywhere from 60 seconds to 300 seconds after the plate 142 is submerged and/or the heating element 140 has been deactivated. For example, the temperature reading $T_1$ may be about 40 degrees F.

Once the heating element 140 has been activated, the control unit 120 waits a predetermined period of time and then measures a second temperature $T_2$. The predetermined period of time depends on the geometry of the plate 142. For example, for a plate that is approximately cylindrical with a geometry of about 7 inches in diameter by 0.5 inches thick, a predetermined time of 120 seconds may correlate to a 99% likelihood that the temperature read by the temperature sensor 130 has begun to level off, but still occurs before the water temperature has changed. Thus, the water temperature is know from the temperature $T_1$ and the current plate temperature is know from temperature $T_2$. As the water temperature increases, the temperature of the plate 142 will increase. The change in temperature of the water may be correlated with the change in the temperature of the plate by equation (6):

$$\Delta T_p = K_1 \Delta T_w \quad (6)$$

where $\Delta T_p$ is the change in the temperature of the plate, $\Delta T_w$, is the change in the temperature of the water, and $K_1$ is a constant based on the geometry of the plate 142 and the placement of the temperature sensor 130. $K_1$ may be experimentally determined. For example, $K_1$ may be 0.5 to 0.75 depending upon geometry. This correlation can be used to predict the water temperature when the plate 142 temperature is known.

The control unit 110 may determine the temperature of the water while the heating element 140 is activated by using the correlation determined using equation (6) by measuring the temperature of the plate 142 with the temperature sensor 130. The control 110 may determined at what temperature of the plate 142 as detected by the temperature sensor 130 the water has reached the turn-off temperature $T_{off}$ using equation (7):

$$T_{pred} = T_2 + K_1(T_{off} - T_{on}) \quad (7)$$

where $T_{pred}$ is the predicted temperature of the plate 142 as detected by the temperature sensor 130 at which the water temperature has reached the turn-off temperature $T_{off}$. $T_1$ may alternatively be used in place of $T_{on}$ in equation (7). As an example, assuming a plate 142 with $K_1$ equal to ½, the temperature sensor 130 may read 40 degrees F. at $T_1$, which may also be the turn-on temperature $T_{on}$. At $T_2$, the temperature sensor 130 may read 100 degrees F. Thus, using equation (7), the control unit 110 may predict that the water temperature will have reached the turn-off temperature $T_{off}$ of 44 degrees when the temperature sensor 130 reads 100+(½)(44−40)=100+(½)(4)=102 degrees F.

In certain embodiments, the control unit 110 may be adapted to deactivate the heating element 140 and, after a predetermined period of time, determine a water temperature using the temperature sensor 130. For example, the control unit 110 may activate the heating element 140 when the temperature sensor 130 detects that the water temperature has reached a turn-on temperature set-point. The control unit 110 may keep the heating element 140 activate for a predetermined period of time or until the water has been predicted and/or detected to have reached a turn-off temperature, for example. The control unit 110 may then deactivate the heating element 140 for a predetermined period of time for the heating element 140 to cool and/or to allow the heating element 140 and/or plate 142 to reach about equilibrium temperature with the water. The temperature sensor 130 may then detect the temperature of the water, and if it is below the turn-off temperature, the control unit 110 may activate the heating element 140 again to continue heating the water. The predetermined period of time to reach about equilibrium may be 120 to 180 seconds, for example. The predetermined period of time to reach about equilibrium may depend on the geometry of the plate 142.

Figure 7:
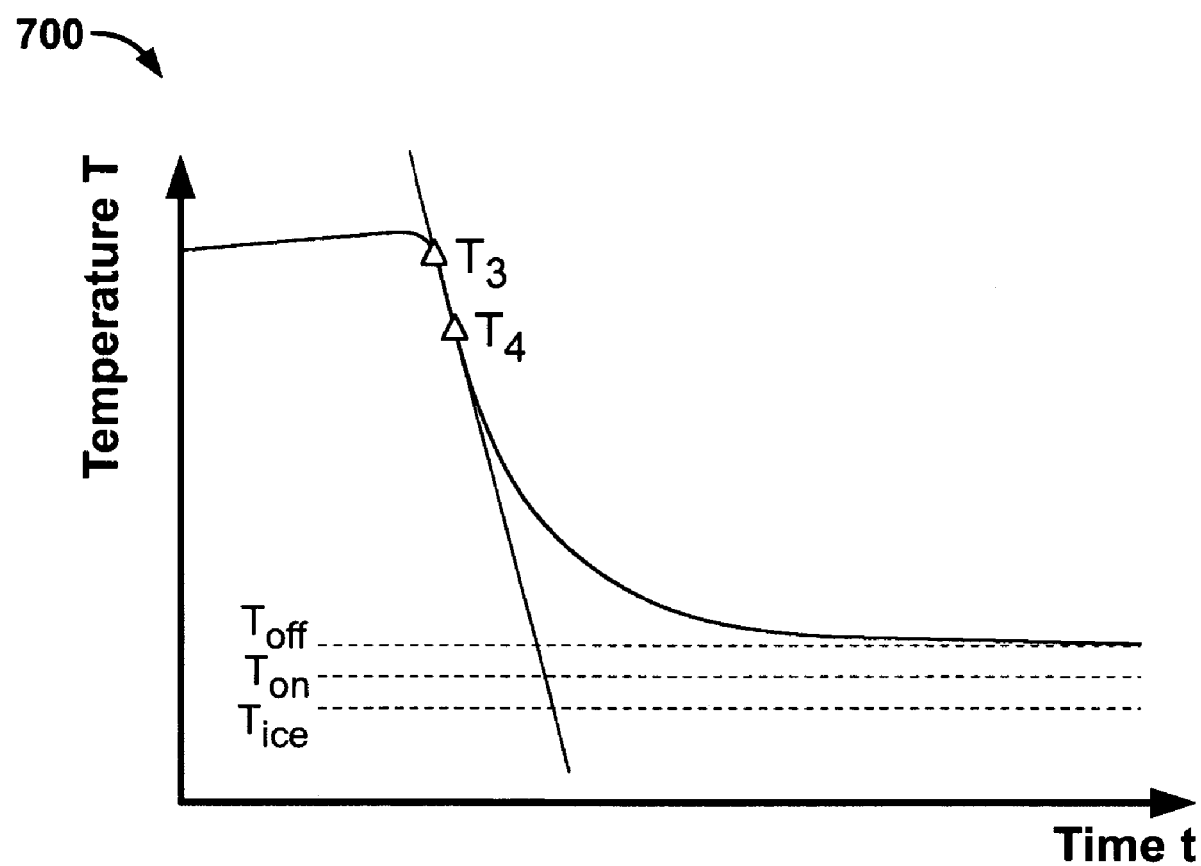
FIG. 7 illustrates a graph of the temperature detected by a temperature sensor over time.

In certain embodiments, the control unit 110 is adapted to predict the temperature of the water based on the temperature of the plate 142 as detected by the temperature sensor 130 before the plate 142 has cooled to an equilibrium temperature with the water. FIG. 7 illustrates a graph 700 of the temperature detected by the temperature sensor 130 over time. The graph 700 includes a freezing point $T_{ice}$, a turn-on temperature $T_{on}$, and a turn-off temperature $T_{off}$. The freezing point $T_{ice}$ may be about 32 degrees F., for example. The turn-on temperature $T_{on}$ may be about 40 degrees F., for example. The turn-off temperature $T_{off}$ may be about 44 degrees F., for example.

In operation, the control unit 110 deactivates the heating element 140. After a predetermined period of time, at time $T_3$, the control unit 110 takes a temperature reading with temperature sensor 130. As discussed above, the temperature sensor 130 may be in contact with and/or embedded at least in part in the plate 142. Thus, the temperature detected by the temperature sensor 130 may include a combination of the temperature of the plate 142 and of the temperature of the water. The control unit 110 may wait between 0 and 15 seconds, for example, before detecting temperature $T_3$. The delay in time between deactivating heating element 140 and detecting temperature $T_3$ is to allow for the heating element 140 to reduce generating heat, since the heating element 140 will not cease to generate heat and/or cool instantaneously after it has been deactivated.

The control unit 110 next detects a temperature $T_4$ with the temperature sensor 130 some predetermined period of time after detecting temperature $T_3$. For example, $T_4$ may be detected between 1 and 10 seconds after $T_3$ has been detected. The rate of cooling of the plate 142 may be determined using equation (8):

$$S = (T_4 - T_3)/\Delta t \quad (8)$$

where S is the rate of cooling or slope of the line between $T_4$ and $T_3$ and $\Delta t$ is the time interval between the detection of $T_3$ and $T_4$. Thus, if the time interval $\Delta t$ is too small, errors may be increased due to the resolution of the temperature sensor 130. In addition, if the time interval $\Delta t$ is too large, the rate of cooling (S) may not be accurately determined. For example, $\Delta t$ may be 5 seconds to reduce these potential sources of error.

Once the rate of cooling has been determined by the control unit 110, the control unit 110 may predict the equilibrium temperature that the plate 142 will cool to. That is, the control unit 110 may predict and/or determine the temperature of the water before the plate 142 has cooled to equilibrium. The temperature of the water may be predicted using equation (9), based on Newton's Law of Cooling:

$$T_{calc} = T_3 + K_2 S \tag{9}$$

where $T_{calc}$ is the predicted temperature of the water, $K_2$ is a constant expressed in seconds that depends on the geometry of the plate 142, and S is the slope determined above using equation (8). Note that S is typically negative. $K_2$ may be, for example, 30 seconds.

Thus, when the heating element 140 is deactivated, it typically takes 60 to 300 seconds for the temperature of the aluminum base to reach that of the surrounding water temperature. However, using the control unit 110 the water temperature may be determined within 10-20 seconds of deactivating the heating element 140.

Figure 8:
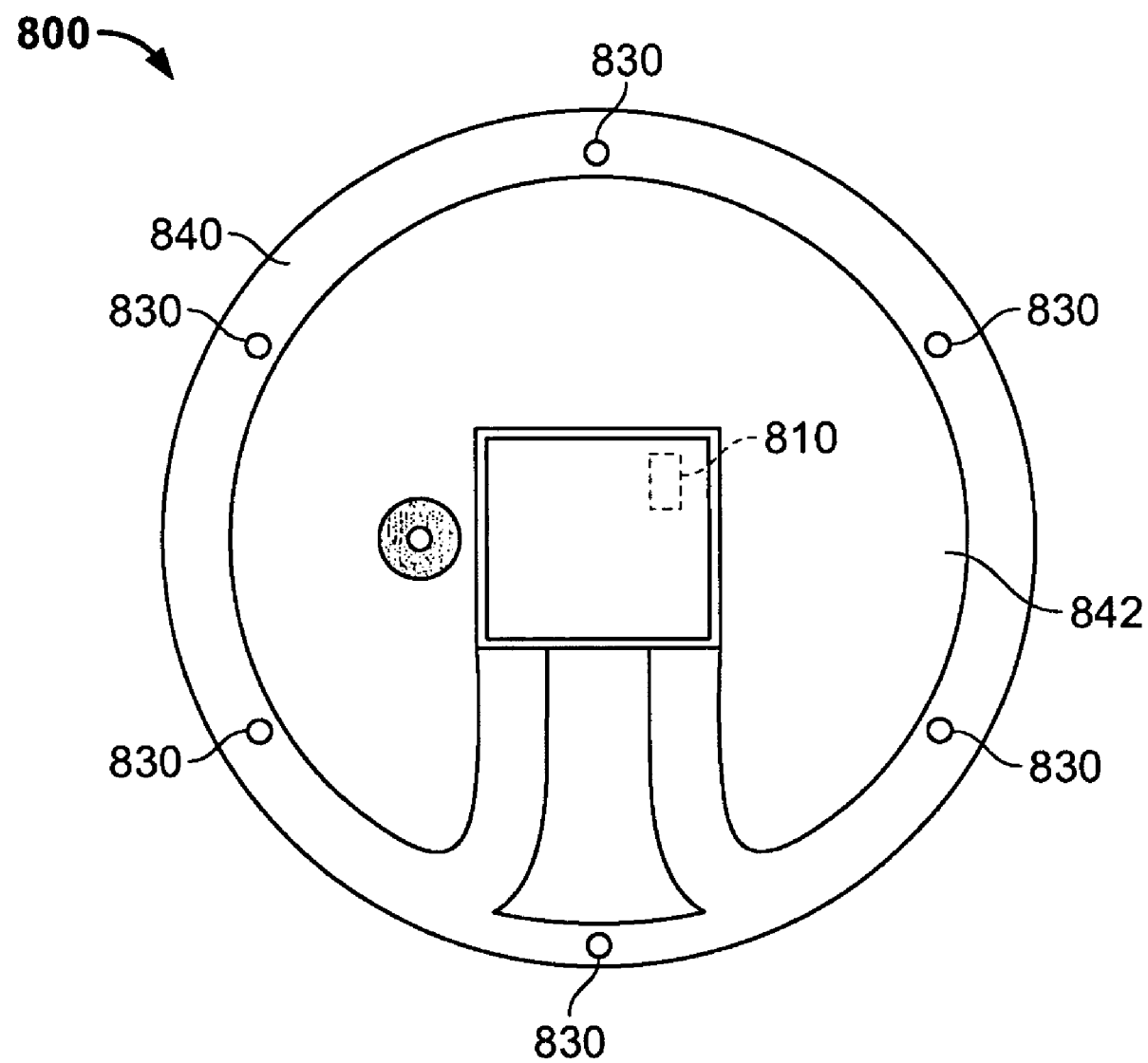
FIG. 8 illustrates a bottom perspective view of a deicing system according to an embodiment of the present invention.

FIG. 8 illustrates a bottom perspective view of a deicing system 800 according to an embodiment of the present invention. The deicing system 800 includes a control unit 810, one or more temperature sensors 830, a heating element 840, and a plate 842. The deicing system 800 may be similar to deicing system 100, described above, for example. The deicing system 800 may further include elements similar to those in one or more embodiments of deicing system 800 with similar capabilities and/or functions, as described above, for example.

The control unit 810 may be similar to the control unit 110, described above, for example. The temperature sensor 830 may be similar to the temperature 130, described above, for example. The heating element 840 may be similar to the heating element 140, described above, for example. The plate 842 may be similar to the plate 142, described above, for example.

The heating element 840 is adapted to transfer heat to a fluid. The heating element 840 may be a calorimeter rod, for example. The heating element 840 may be connected, embedded, encased, enclosed, in whole or in part, within the plate 842. For example, as illustrated in FIG. 8, the heating element 840 is embedded in the plate 842. The heating element 840 may be thermally coupled to the plate 842. The plate 842 may be aluminum, copper, or other element, alloy, or material capable of transferring heat from the heating element 840 to a fluid.

In operation, the control unit 810 activates and/or deactivates the heating element 840 based at least in part on a temperature sensed by the one or more temperature sensors 830. The control unit 810 is adapted to deactivate the heating element 140 when an over-temperature condition occurs. The control unit 810 may detect the over-temperature condition based at least in part on one or more temperatures detected and/or determined by the one or more temperature sensors 830.

The one or more temperature sensors 830 may be in communication with a control unit. The control unit may be similar to the control unit 110, described above, for example. The one or more temperature sensors 830 may each be in direct communication with the control unit, for example. Alternatively, the one or more temperature sensors 830 may be connected in series with the control unit 110.

The one or more temperature sensors 830 may be positioned on, through, and/or around heating element 840 and/or the plate 842. The temperature sensors 830 are adapted to determine the temperature of a section and/or portion of heating element 840. The temperature sensors 830 may be positioned approximately equidistant around the outer edge of the heating element 840 and/or plate 842. In certain embodiments, the deicing system 800 includes at least six temperature sensors 830. For example, the deicing system 800 may include 6 thermistors positioned every 60 degrees around an annular aluminum plate, near the outer edge.

The control unit 810 may be adapted to deactivate the heating element 840 if one or more temperature sensors 830 exceed a predetermined temperature. For example, the control unit 810 may deactivate the heating element 840 if the temperature sensor 830 indicates a temperature in excess of 160 degrees F. Alternatively, the control unit 810 may be adapted to deactivate the heating element 840 when the difference in the temperature reading from two or more temperature sensors 830 exceeds a predetermined value. For example, the control unit 810 may deactivate the heating element 840 when the difference in temperature detected by two temperature sensors 830 exceeds 30 degrees F.

Figure 9:
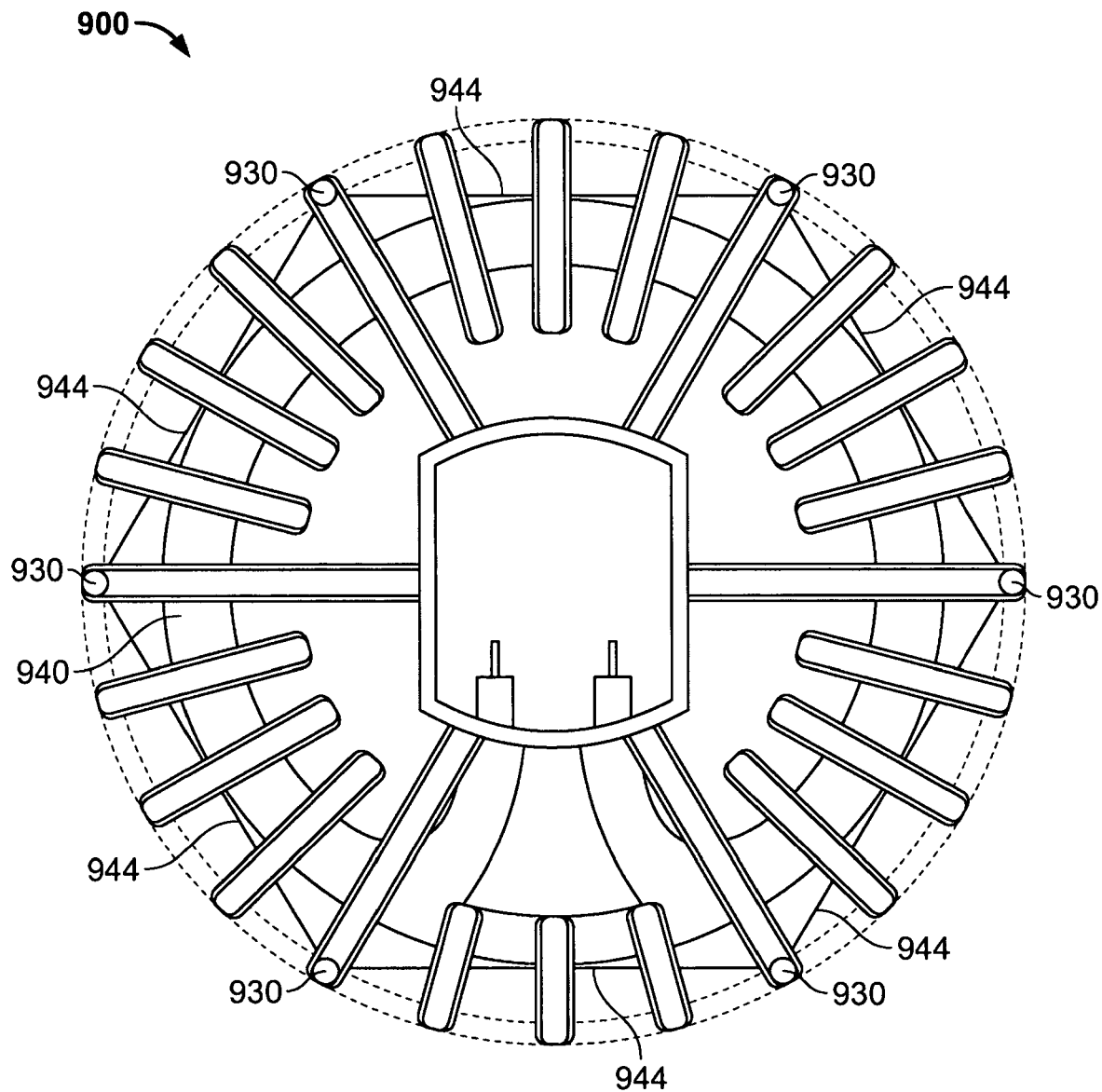
FIG. 9 illustrates a top view of a plate according to an embodiment of the present invention.

In certain embodiments, the one or more temperature sensors 830 are positioned so that at least one sensor 830 will be out of the water if a portion and/or section of the heating element 840 and/or plate 842 is exposed. FIG. 9 illustrates a top view of a plate 900 according to an embodiment of the present invention. The plate 900 includes one or more temperature sensors 930, a heating element 940, and one or more heat path elements 944.

The plate 900 may be similar to the plate 142 and/or the plate 842, described above, for example. The temperature sensor 930 may be similar to the temperature sensor 130 and/or the temperature sensor 830, described above, for example. The heating element 940 may be similar to the heating element 140 and/or the heating element 840, discussed above, for example.

The heat path elements 944 provide a thermal path from the edge of the plate 900 to at least one temperature sensor 930. The temperature sensors 930 are spaced about equidistantly around the edge of the plate 900. With the configuration illustrated in FIG. 9, when a portion or section of the plate 900 and/or heating element 940 is exposed, there is at least one heat path element 944 from the exposed portion to at least one temperature sensor 930 that is not submerged.

Referring again to FIG. 8, in an embodiment, the temperature sensor 830 may include a wire wrapped around and/or encircling the heating element 840 and/or the plate 842. The wire may exhibit a measurable Temperature Coefficient of Resistivity (TCR). For example, copper wire with a TCR of 0.003 ohms per degree F., or nickel wire with a TCR of 0.006 ohms per degree may be used. The resistivity of the wire may change as a function of temperature. By monitoring the resistance or voltage drop through the wire, the control unit 810 may determine if the wire has gotten hotter, or if a portion of the wire has gotten hotter. Thus, the control unit 810 may detect this over-temperature condition and deactivate the heating element 840.

For example, a 30 gauge copper wire 20 feet long, has a resistance of 2.3 ohms at 130 degrees F. As the temperature changes, the resistivity, and hence the resistance, of the wire will change as given by equation (10):

$$\rho = \rho(1 + k\Delta T) \tag{10}$$

where $\rho$ is the resistivity, k is the TCR, and $\Delta T$ is the change in temperature. Thus, if the temperature doubles from 130 degrees F. to 260 degrees F., the resistance increase to approximately 2.9 ohms, a 26% change. However, even if only a portion of the heating element 840 is exposed above the water, a change in the resistance or voltage may be detected. For example, when 15% of the heating element 840 is exposed, there would still be a 4% change in the resistance of the wire. At 120 volts, that represents a voltage change of almost 5 volts, which may be detected by the control unit 810.

In certain embodiments, the temperature sensor 830 may include a wire inserted inside heating element 840 and/or plate 842. The resistance or voltage drop across the wire may be monitored in a manner similar to that described above. In certain embodiments, the wire that supplies energy to the heating element 840 may possess a sufficiently large TCR to be monitored. Alternatively, the sheath of the heating element 840 may be monitored for resistance or voltage drop.

Another method for detecting temperature rises in the heating element 840 is to note the resonance frequency of the cavity formed by the sheath around the heating element 840. When the heating element 840 is removed from the water, the heating element 840 heats up and the sheath expands forming a larger cavity. The resonance frequency of the cavity would therefore change as the sheath expands when it is heated. Thus, the control unit 810 may be adapted to monitor the resonance frequency of the cavity to determine a possible over-temperature condition.

A common non-adjustable thermostat consists of a bimetal arm that utilizes the different expansion rates between two metals to trip a switch. In order for the metals to expand, heat accumulates in the thermostat and heats up the metals. In a deicer, the thermostat is typically placed against a metal plate that provides a heat path from the heater coil. The rate at which heat will flow is given by equation (4), discussed above. From equation (4) it is seen that the rate of heat flow (H) may be changed by changing the cross-sectional area (A) of the heat path. For example, increasing the area increases the rate of heat flow. In a thermostat, increased heat flow may improve the response time of the device.

Many situations involve a steady-state or equilibrium condition whereby the heat flow into an object is balanced by the heat flow out of an object. The total heat in or out of an object is then given by equation (11):

$$H_{total} = H_{in} - H_{out} \quad (11)$$

where $H_{total}$ is the total heat flow into or out of the object, $H_{in}$ is the heat flow into the object, and $H_{out}$ is the heat flow out of the object. In a steady-state condition, $H_{in}$ equals $H_{out}$ and the total heat flow $H_{total}$ is zero. If, however, $H_{in}$ is larger than $H_{out}$, the heat flow into the object is positive and the object will heat up. Conversely, if $H_{in}$ is smaller than $H_{out}$, the object will cool down.

A deicer will typically have a thermostat in thermal communication with the water through the body of the deicer, and in thermal communication with the heater through a separate thermal path. The heater may be similar to the heating element 140 and/or the heating element 840, discussed above, for example. When the heater is energized, heat typically flows to the thermostat through the thermal path from the heater while the water acts as a heat sink as described by equation (11).

As discussed above with respect to equation (1), when heat is applied to a substance, the resulting temperature rise (ΔT) is a function of the amount of heat applied (ΔQ), the mass of the substance (M), and the specific heat of the substance (c). However, the amount of heat applied (ΔQ) is simply the rate of heat flow (H) during a period of time (Δt), so substituting in equation (1) yields equation (12):

$$H\Delta t = Mc\Delta T \quad (12)$$

Solving for ΔT in equation (12) yields equation (13):

$$\Delta T = (H/Mc)\Delta t \quad (13)$$

For a thermostat in thermal contact with both the water and the heater, the thermostat will be heated by both the water and the separate path to the heater. In a typical situation, heat will flow into the thermostat from the heater faster than heat from the water. Thus, the water acts as a baseline or heat sink for the thermostat with some heat flowing from the heater through the thermostat and on into the water. The net heat flow to the thermostat is therefore in the form of equation (11) with two heat sources as given by equation (14):

$$H_{total} = H_{heater} - H_{loss} \quad (14)$$

where $H_{heater}$ is the heat flow from the heater to the thermostat, and $H_{loss}$ is the heat loss from the thermostat to the water. By adjusting $H_{heater}$ and/or $H_{loss}$, a positive heat flow into the thermostat can be established such that the thermostat heats up at a faster rate than the surrounding water.

In equation (14), $H_{heater}$, the heat flow from the heater to the thermostat, may be increased by increasing the cross-sectional area of the heat path between the two. Therefore, the thermostat will heat up at a faster rate. Because of the positive heat flow into the thermostat, the thermostat will reach its set point temperature before the water temperature has only risen to that temperature. Thus, as compared to a thermostat configured for a balanced heat flow, even though the set point of the thermostat has not changed, the maximum water temperature has been decreased as a direct result of increasing the thermal path between the heater and the thermostat.

Figure 10:
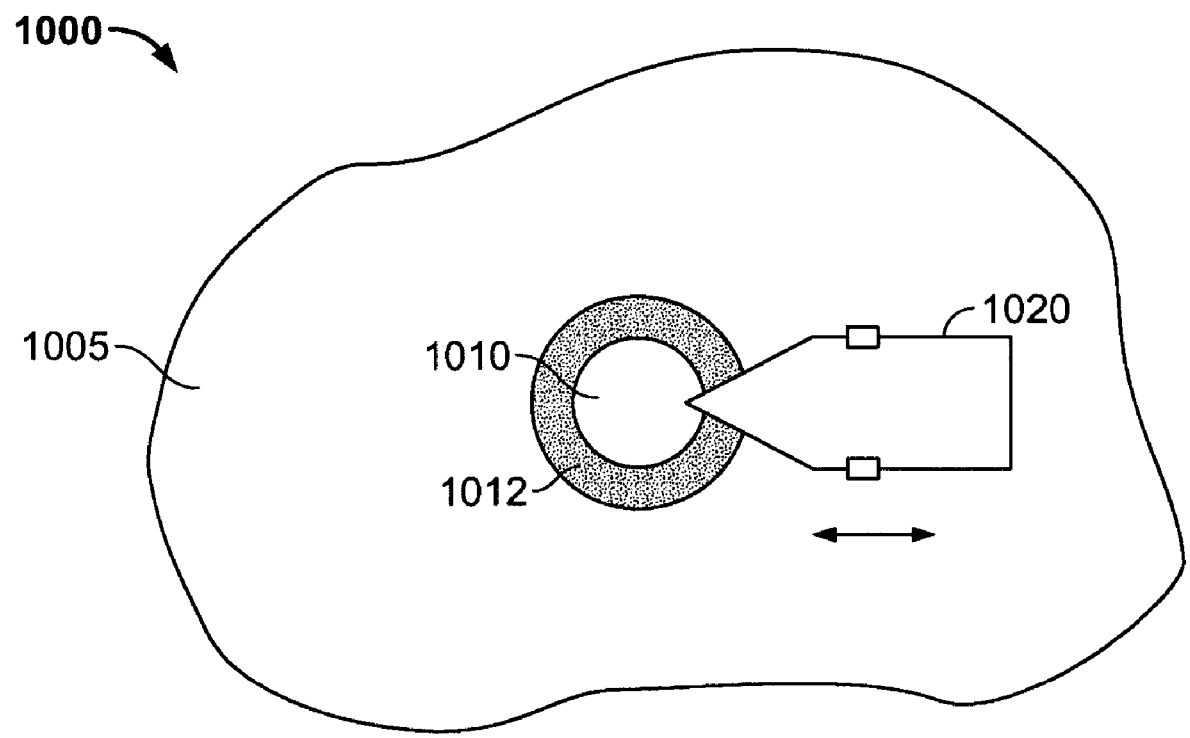
FIG. 10 illustrates a deicer according to an embodiment of the present invention.

Certain embodiments of the present invention include a deicer with a thermostat that is thermally insulated from the heating producing portions of the deicer while being in thermal communication with the water. FIG. 10 illustrates a deicer 1000 according to an embodiment of the present invention. FIG. 10 includes a base 1005, a thermostat 1010, insulating material 1012, and a movably connected tab 1020. The base may include a heating element or a plate. The heating element may be similar to the heating element 140, described above, for example. The plate may be similar to the plate 142 described above, for example. The thermostat may be similar to the temperature sensor 130, described above, for example.

In operation, a thermal path from the heater to the thermostat is provided by the tab 1020. The tab 1020 may be, for example, a moveable metal strip or cover. The tab is configured and/or designed so that the cross-sectional area, or "waist," of the thermal path may be increased or decreased by adjustment of the tab 1020.

The base 1005 is thermally connected to the heating element 140, while the thermostat 1010 is thermally isolated from the heating element 140. When moved across the thermostat 1010, the tab 1020 provides a thermal path from the base 1005 to the thermostat 1010. As the tab 1020 is moved to the left in FIG. 10, the line of contact, and thus, the waist, between the tab 1020 and the thermostat 1010 increases. The increased waist area means that the rate of heat flow from the heater to the thermostat ($H_{heater}$) is increased, and thus the response time of the thermostat is faster.

Therefore, for a given set point, speeding up the response time means that the thermostat 1010, and thus the heater, will shut off sooner while the water is still at a lower temperature. Conversely, decreasing the waist area allows the water to heat to a higher temperature before the heater shuts off. If the thermal path from the heater to the thermostat 1010 is detached, the thermostat will track the water temperature alone and the water will heat until it reaches the set point of the thermostat.

Figure 11:
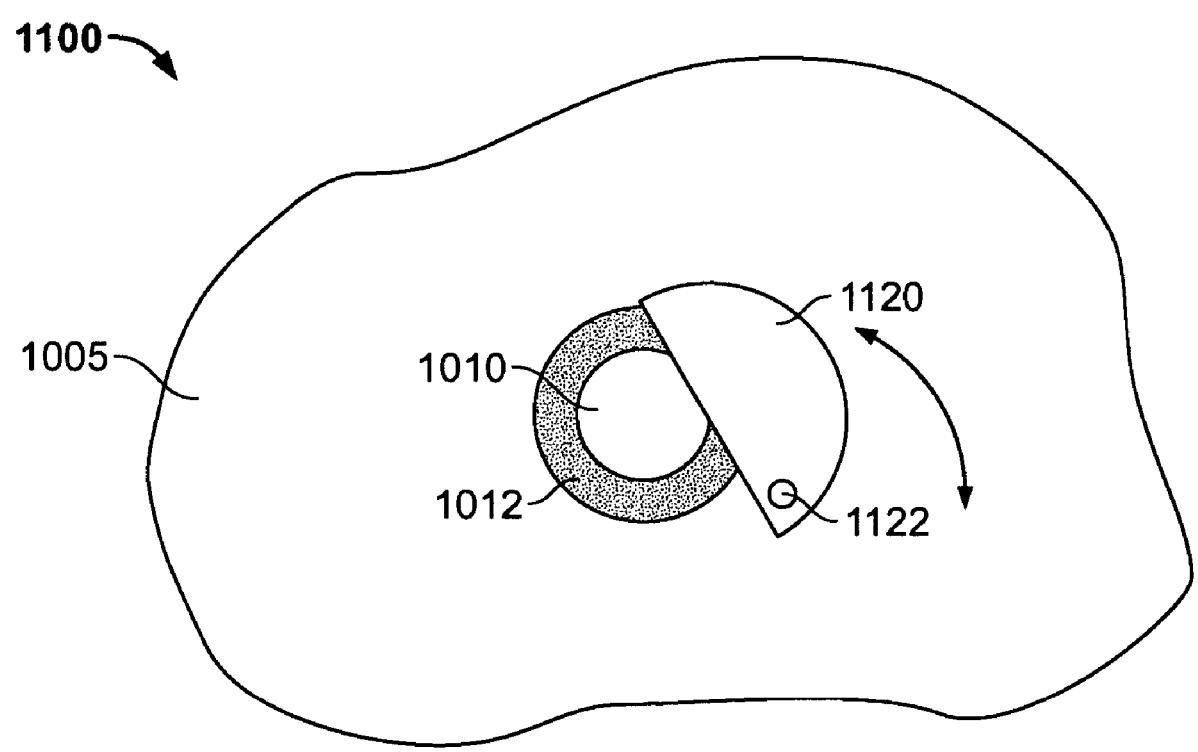
FIG. 11 illustrates a deicer according to an embodiment of the present invention.

FIG. 11 illustrates a deicer 1100 according to an embodiment of the present invention. FIG. 11 includes elements similar to those illustrated in FIG. 10 with similar numbers. The tab 1020 tab in FIG. 11 is rotated about a pivot 1122, rather than slid, to increase or decrease the amount of contact with the thermostat 1010.

Figure 12:
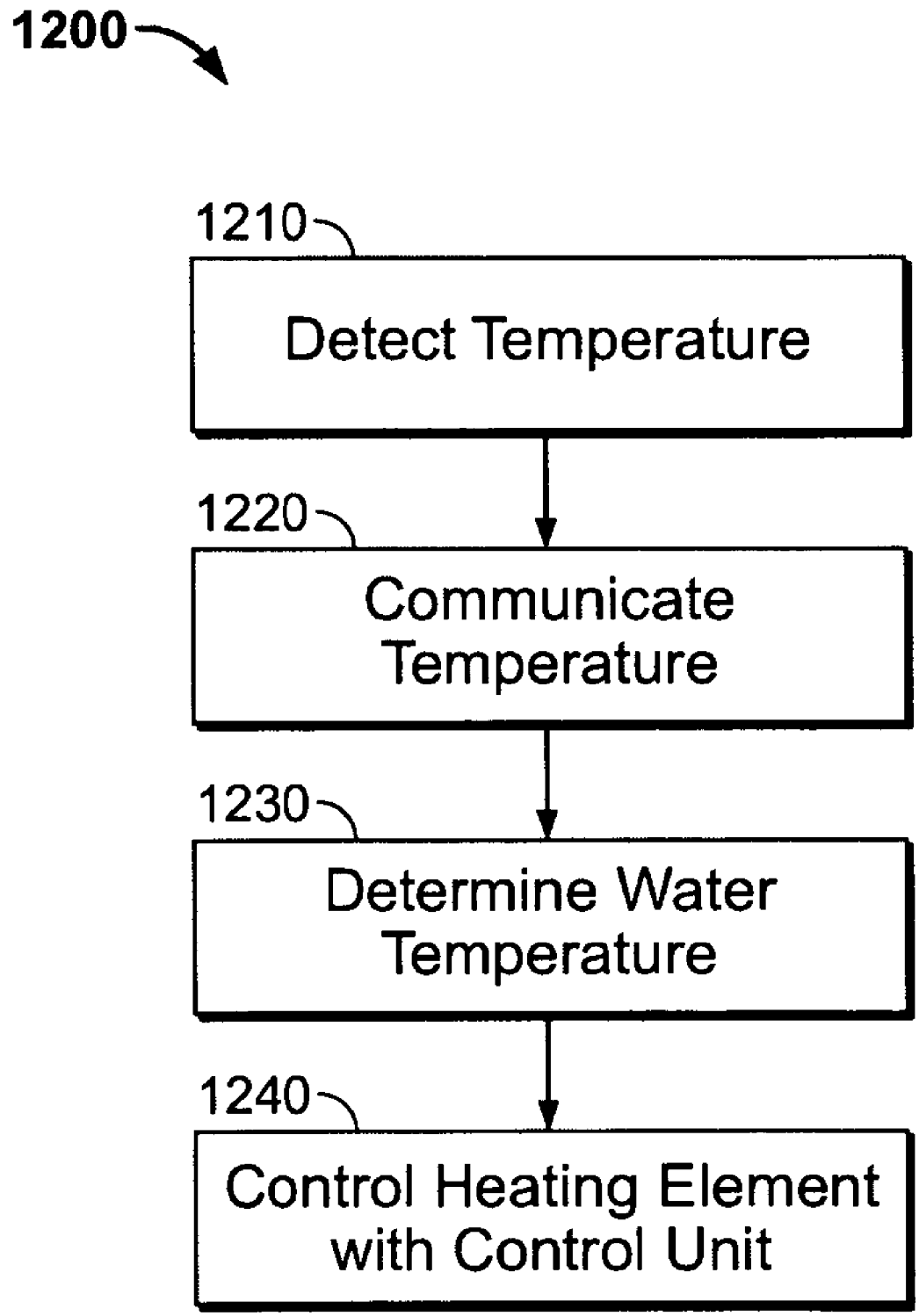
FIG. 12 illustrates a flow diagram for a method of controlling a heating element in a deicing system according to an embodiment of the present invention.

FIG. 12 illustrates a flow diagram for a method 1200 of controlling a heating element in a deicing system according to an embodiment of the present invention. The method 1200 includes the following steps, which will be described below in more detail. At step 1210, a temperature is detected. At step 1220, a temperature is communicated. At step 1230, a water temperature is determined. At step 1240, a heating element is controlled with a control unit. The method 1200 is described with reference to elements of systems described above, but it should be understood that other implementations are possible.

At step 1210, a temperature is detected. The temperature may be detected by a temperature sensor, for example. The temperature sensor may be similar to the temperature sensor 130 and/or the temperature sensor 830, described above, for example. The temperature may be a fluid temperature, a temperature of all or a section of the heating element 140 and/or the plate 142, for example. The resolution or sensitivity of the detected temperature may be on the order of 1 degree F. Alternatively, the resolution or sensitivity of the detected temperature may be on the order of 0.2 degrees F.

The temperature may be detected by a thermistor, thermometer, thermocouple, resistance temperature detector, silicon bandgap temperature sensor, and/or other component adapted to create a signal that may be measured electronically and/or electrically as a function of temperature.

In certain embodiments, the temperature may be detected, read, and/or determined using one or more temperature sensors. For example, the deicing system 100 may include a temperature sensor 130 for determining fluid temperature and a temperature sensor 130 for determining the temperature of the plate 142. As another example, the deicing system 800 may include one or more temperature sensors 830 for detecting the temperature of the heating element 840 and/or the plate 842.

At step 1220, a temperature is communicated. The temperature may be the temperature detected at step 1210, for example. The temperature may be communicated to a control unit, for example. The control unit may be similar to the control unit 110 and/or the control unit 810, described above, for example.

At step 1230, a water temperature is determined. The water temperature may be determined by a control unit, for example. The control unit may be similar to the control unit 110 and/or the control unit 810, described above, for example.

In certain embodiments, the temperature is determined while the heating element is activated. For example, when the temperature sensor 130 detects that the temperature of the water and/or the heating element 140 and/or the plate 142 has reached the turn-on temperature, the control unit 110 may take and store a first temperature reading and then activate the heating element 140. Because the temperature sensor 130 may be in contact with and/or embedded in the plate 142, the temperature detected by the temperature sensor 130 reflects the temperature of the plate 142. Once the heating element 140 has been activated, the control unit 120 waits a predetermined period of time and then measures a second temperature. The predetermined period of time depends on the geometry of the plate 142. As the water temperature increases, the temperature of the plate 142 will increase. The control unit 110 may determine the temperature of the water while the heating element 140 is activated by using the correlation determined using equation (6), discussed above, by measuring the temperature of the plate 142 with the temperature sensor 130. The control 110 may determined at what temperature of the plate 142 as detected by the temperature sensor 130 the water has reached the turn-off temperature using equation (7), as discussed above.

In certain embodiments, the temperature is determined after the heating element has been deactivated for a predetermined period of time. For example, the control unit 110 may be adapted to deactivate the heating element 140 and, after a predetermined period of time, determine a water temperature using the temperature sensor 130. For example, the control unit 110 may activate the heating element 140 when the temperature sensor 130 detects that the water temperature has reached a turn-on temperature set-point. The control unit 110 may keep the heating element 140 activate for a predetermined period of time or until the water has been predicted and/or detected to have reached a turn-off temperature, for example. The control unit 110 may then deactivate the heating element 140 for a predetermined period of time for the heating element 140 to cool and/or to allow the heating element 140 and/or plate 142 to reach about equilibrium temperature with the water. The temperature sensor 130 may then detect the temperature of the water, and if it is below the turn-off temperature, the control unit 110 may activate the heating element 140 again to continue heating the water. The predetermined period of time to reach about equilibrium may be 120 to 180 seconds, for example. The predetermined period of time to reach about equilibrium may depend, for example, on the geometry of the plate 142.

In certain embodiments, the temperature is determined based at least in part on a first temperature detected shortly after the heating element has been deactivated and a second temperature detected a predetermined period of time after the first temperature has been detected. For example, the control unit 110 is adapted to predict the temperature of the water based on the temperature of the plate 142 as detected by the temperature sensor 130 before the plate 142 has cooled to an equilibrium temperature with the water. The control unit 110 deactivates the heating element 140. After a predetermined period of time, the control unit 110 takes a first temperature reading with temperature sensor 130. As discussed above, the temperature sensor 130 may be in contact with and/or embedded at least in part in the plate 142. Thus, the temperature detected by the temperature sensor 130 may include a combination of the temperature of the plate 142 and of the temperature of the water. The control unit 110 may wait between 0 and 15 seconds, for example, before detecting the first temperature. The delay in time between deactivating heating element 140 and detecting the first temperature is to allow for the heating element 140 to reduce generating heat, since the heating element 140 will not cease to generate heat and/or cool instantaneously after it has been deactivated. The control unit 110 next detects a second temperature with the temperature sensor 130 some predetermined period of time after detecting the first temperature. For example, the second temperature may be detected between 1 and 10 seconds after the first temperature has been detected. Once the rate of cooling has been determined by the control unit 110, the control unit 110 may predict the equilibrium temperature that the plate 142 will cool to. That is, the control unit 110 may predict and/or determine the temperature of the water before the plate 142 has cooled to equilibrium. The temperature of the water may be predicted using equation (9), as discussed above.

At step 1240, a heating element is controlled with a control unit. The heating element may be similar to the heating element 140 and/or the heating element 840, described above, for example. The control unit may be similar to the control unit 110 and/or the control unit 810, described above, for example. In certain embodiments, the control unit controls the heating element by activating and/or deactivating the flow of power to the heating element. When power flows to the heating element, the heating element generates heat. That is, the heating element is activated. When power is prevented from flowing to the heating element, the heating element does not generate heat. That is, the heating element is deactivated.

The control unit may activate and/or deactivate the heating element based at least in part on a temperature sensed by a temperature sensor. The temperature sensor may be similar to the temperature sensor 130 and/or the temperature sensor 830, described above, for example. The temperature may be the temperature detected at step 1210, described above, for example. The temperature may be the temperature communicated at step 1220, described above, for example. The temperature may be the temperature determined at step 1230, described above, for example.

In certain embodiments, the control unit may control the heating element based at least in part on elapsed time. For example, the control unit 110 may control the heating element 140 based on how long the heating element 140 has been activated. As another example, the control unit 110 may control the heating element 140 based on a measurement of the number of milliseconds and/or microseconds between temperature readings/determinations. In certain embodiments, the control unit controls the heating element to prevent a dangerous condition such as an over-temperature condition. For example, one or more temperature sensors 830 may be monitored by the control unit 810 to deactivate the heating element 840 when the heating element 840 reaches a critical temperature. For example, if some portion or section of the heating element 840 and/or the plate 842 becomes located outside of a fluid (e.g., exposed), the heating element 840 and/or the plate 842 may overheat. The overheated condition may be detected by the control unit 810, which may in turn deactivate the heating element 840 to prevent damage to the deicing system 800 and/or to other animals, persons, and/or objects near the deicer system 800.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Thus, certain embodiments of the present invention provide systems and methods for a deicer capable of making more accurate temperature determinations and of making more intelligent decisions regarding temperature conditions. Further, certain embodiments provide systems and methods for detecting over-temperature conditions, where all or a portion of a heating element is exposed. In addition, certain embodiments provide systems and methods for controlling the response of a thermostat that would otherwise be non-adjustable.

Additionally, certain embodiments provide a technical effect of a deicer capable of making more accurate temperature determinations and of making more intelligent decisions regarding temperature conditions. Certain embodiments provide a technical effect of detecting over-temperature conditions, where all or a portion of a heating element is exposed. Certain embodiments provide a technical effect of controlling the response of a thermostat that would otherwise be non-adjustable.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A deicer system for heating water within a fluid receptacle to prevent ice from forming, the system comprising:
    a main body configured to be positioned within the fluid receptacle;
    a heating element adapted to heat the water, wherein said heating element is supported by said main body;
    a temperature sensor adapted to detect a temperature, wherein said temperature sensor is thermally connected to said heating element, wherein said temperature sensor includes at least one of a thermistor, thermocouple, resistance temperature detector, thermometer, and silicon bandgap temperature sensor; and
    a control unit in communication with said heating element and said temperature sensor, wherein said control unit comprises at least one of a processor, a microprocessor, an integrated circuit, and a plurality of discrete logic components, wherein said control unit is adapted to determine a temperature of the water based at least in part on the temperature detected by said temperature sensor, and wherein said control unit is adapted to control said heating element based at least in part on the determined temperature of the water, wherein said control unit is adapted to deactivate said heating element and wait until said heating element has reached about an equilibrium temperature with the water to detect a temperature with said temperature sensor, and wherein said control unit is adapted to activate said heating element when said detected temperature is below a predetermined turn-off temperature.

2. The system of claim 1, wherein said control unit is adapted to control said heating element over at most a ten degree temperature range.

3. The system of claim 1, wherein said control unit is adapted to determine the temperature of the water while said heating element is activated.

4. The system of claim 1, wherein said control unit is adapted to determine the temperature of the water based at least in part on a first temperature detected by said temperature sensor before said heating element is activated and a second temperature detected by said temperature sensor after said heating element is activated.

5. The system of claim 1, wherein said control unit is adapted to deactivate said heating element and determine a temperature of the water based at least in part on a temperature detected by said temperature sensor before said heating element has reached about an equilibrium temperature with the water.

6. The system of claim 1, wherein said control unit is adapted to determine the temperature of the water based at least in part on a prediction, wherein the prediction is based on at least two temperatures detected after said heating element has been deactivated and before said heating element has reached about an equilibrium temperature with the water.

7. The system of claim 1, further including a plurality of temperature sensors in electrical communication with said control unit.

8. The system of claim 7, further comprising at least one heat path element thermally connecting each of said plurality of temperature sensors to said heating element.

9. The system of claim 8, wherein said at least one heat path element is configured so that if a section of said heating element is exposed from the water a path from the exposed section of said heating element to said temperature sensor along said heat path is also exposed.

10. The system of claim 8, wherein said control unit is adapted to deactivate said heating element when at least one of said plurality of temperature sensors detects a temperature exceeding a predetermined over-temperature value.

11. A method for controlling a heating element in a deicer system configured to be positioned within a fluid receptacle to prevent ice from forming within the fluid receptacle, the method comprising:

detecting a temperature with a temperature sensor;
  communicating the detected temperature to a control unit;
  determining with the control unit a temperature of the water based at least in part on the detected temperature, wherein said determining includes determining the temperature of the water based at least in part on a prediction, wherein the prediction is based on at least two temperatures detected after the heating element has been deactivated and before the heating element has reached about an equilibrium temperature with the water; and
  controlling with the control unit a heating element based on the determined temperature of the water.

12. The method of claim 11, wherein the control unit controls the heating element over at most a ten degree temperature range.

13. The method of claim 11, wherein said detecting occurs while the heating element is activated.

14. The method of claim 11, wherein said determining includes a first temperature detected by the temperature sensor before the heating element is activated and a second temperature detected by the temperature sensor after the heating element is activated.

15. The method of claim 11, further including deactivating the heating element and waiting until the heating element has reached about an equilibrium temperature with the water before performing said detecting step, and wherein said controlling step includes activating the heating element when the detected temperature is below a predetermined turn-off temperature.

16. The method of claim 11, wherein said determining includes deactivating the heating element and determining a temperature of the water based at least in part on a temperature detected by the temperature sensor before the heating element has reached about an equilibrium temperature with the water.

17. The method of claim 11, wherein said controlling includes deactivating the heating element when the temperature sensor detects a temperature exceeding a predetermined over-temperature value.

18. A deicer system for heating water within a fluid receptacle to prevent ice from forming, the system comprising:

a main body configured to be positioned within the fluid receptacle;
  a heating element adapted to heat the water, wherein said heating element is supported by said main body;
  a temperature sensor adapted to detect a temperature, wherein said temperature sensor is thermally connected to said heating element, wherein said temperature sensor includes at least one of a thermistor, thermocouple, resistance temperature detector, thermometer, and silicon bandgap temperature sensor; and
  a control unit in communication with said heating element and said temperature sensor, wherein said control unit comprises at least one of a processor, a microprocessor, an integrated circuit, and a plurality of discrete logic components, wherein said control unit is adapted to determine a temperature of the water based at least in part on the temperature detected by said temperature sensor, and wherein said control unit is adapted to control said heating element based at least in part on the determined temperature of the water, wherein said control unit is adapted to determine the temperature of the water based at least in part on a prediction, wherein the prediction is based on at least two temperatures detected after said heating element has been deactivated and before said heating element has reached about an equilibrium temperature with the water.

* * * * *